US010533566B2

(12) United States Patent
Araki et al.

(10) Patent No.: US 10,533,566 B2
(45) Date of Patent: Jan. 14, 2020

(54) COMPRESSOR VANE OR BLADE FOR ENGINE WITH EXFOLIATING COATING

(71) Applicants: IHI Corporation, Koto-ku (JP); HITACHI METALS, LTD., Minato-ku (JP)

(72) Inventors: Takahito Araki, Tokyo (JP); Yuta Tanaka, Tokyo (JP); Kazuhiko Kakinuma, Tokyo (JP); Masanobu Baba, Tokyo (JP); Issei Otera, Tokyo (JP); Kana Morishita, Shimane (JP); Shuho Koseki, Shimane (JP)

(73) Assignees: IHI Corporation, Koto-ku (JP); HITACHI METALS, LTD., Minato-ku (JP)

( * ) Notice: Subject to any disclaimer, the term of this patent is extended or adjusted under 35 U.S.C. 154(b) by 267 days.

(21) Appl. No.: 15/635,402

(22) Filed: Jun. 28, 2017

(65) Prior Publication Data
US 2017/0298945 A1   Oct. 19, 2017

Related U.S. Application Data

(63) Continuation of application No. PCT/JP2016/059656, filed on Mar. 25, 2016.

(30) Foreign Application Priority Data

Apr. 2, 2015   (JP) ................. 2015-075763

(51) Int. Cl.
*F04D 29/02* (2006.01)
*F04D 29/32* (2006.01)
(Continued)

(52) U.S. Cl.
CPC .......... *F04D 29/023* (2013.01); *F01D 5/288* (2013.01); *F02C 7/30* (2013.01); *F04D 29/324* (2013.01);
(Continued)

(58) Field of Classification Search
CPC ...... F01D 5/288; F02C 7/30; F05D 2260/607; F05D 2300/611
(Continued)

(56) References Cited

U.S. PATENT DOCUMENTS 3,514,216 A * 5/1970 McAninch ............ F01D 5/288
415/199.5
3,857,682 A * 12/1974 White ..................... C23C 14/32
204/192.15
(Continued)

FOREIGN PATENT DOCUMENTS

CN         1417477 A      5/2003
CN       101876327 A     11/2010
(Continued)

OTHER PUBLICATIONS

Extended European Search Report dated Jun. 5, 2018 in Patent Application No. 16772646.2, 7 pages.
(Continued)

*Primary Examiner* — Moshe Wilensky
*Assistant Examiner* — Topaz L. Elliott
(74) *Attorney, Agent, or Firm* — Oblon, McClelland, Maier & Neustadt, L.L.P.

(57) ABSTRACT

When a compressor vane or blade for an engine is used in an environment containing abundant foreign substances, deposits originated from the foreign substances are likely to deposit on surfaces of the vane or blade. The compressor vane or blade according to the present disclosure has a base body of the compressor vane or blade; and a coating covering the base body, which consists essentially of one or more selected from the group of molybdenum disulfide and tungsten disulfide.

4 Claims, 3 Drawing Sheets

(51) Int. Cl.
*F01D 5/28* (2006.01)
*F04D 29/54* (2006.01)
*F02C 7/30* (2006.01)
*F04D 29/70* (2006.01)

(52) U.S. Cl.
CPC ......... *F04D 29/542* (2013.01); *F04D 29/701* (2013.01); *F05D 2220/323* (2013.01); *F05D 2240/12* (2013.01); *F05D 2240/30* (2013.01); *F05D 2260/607* (2013.01); *F05D 2300/13* (2013.01); *F05D 2300/131* (2013.01); *F05D 2300/2291* (2013.01); *F05D 2300/30* (2013.01); *F05D 2300/611* (2013.01); *Y02T 50/673* (2013.01); *Y02T 50/675* (2013.01)

(58) Field of Classification Search
USPC ....................................................... 106/479
See application file for complete search history.

(56) References Cited

U.S. PATENT DOCUMENTS

| | | | | |
|---|---|---|---|---|
| 5,240,741 | A * | 8/1993 | Edwards, III | C23C 30/00 427/180 |
| 5,268,216 | A * | 12/1993 | Keem | C10M 103/00 428/216 |
| 6,688,867 | B2 * | 2/2004 | Suman | F04C 18/086 418/178 |
| 6,858,333 | B2 * | 2/2005 | Henderer | C23C 30/005 407/119 |
| 7,927,709 | B2 * | 4/2011 | Eichmann | C23C 28/321 416/241 B |
| 8,366,386 | B2 * | 2/2013 | Quinn | F01D 5/288 415/200 |
| 2002/0191878 | A1 | 12/2002 | Ueda et al. | |
| 2006/0110246 | A1 | 5/2006 | Bruce | |
| 2006/0281861 | A1 * | 12/2006 | Putnam | C09D 183/04 525/104 |
| 2007/0289490 | A1 * | 12/2007 | Jabado | B82Y 30/00 106/286.3 |
| 2008/0145554 | A1 * | 6/2008 | Ghasripoor | B22F 1/0059 427/450 |
| 2009/0007542 | A1 | 1/2009 | Bruce | |
| 2009/0104041 | A1 | 4/2009 | Bruce | |
| 2010/0086397 | A1 | 4/2010 | Varanasi et al. | |
| 2010/0226783 | A1 | 9/2010 | Lipkin et al. | |
| 2010/0247321 | A1 | 9/2010 | Kulkarni et al. | |
| 2010/0247927 | A1 * | 9/2010 | Helmick | C23C 14/16 428/433 |
| 2012/0156052 | A1 * | 6/2012 | Richards | C09D 5/1625 416/241 R |
| 2012/0308842 | A1 | 12/2012 | Schmidt et al. | |
| 2013/0280480 | A1 * | 10/2013 | Uihlein | C23C 28/042 428/116 |
| 2014/0234096 | A1 | 8/2014 | Klam et al. | |
| 2015/0003996 | A1 | 1/2015 | Krishna et al. | |

FOREIGN PATENT DOCUMENTS

| | | | |
|---|---|---|---|
| CN | 103993913 A | 8/2014 | |
| DE | 102004001392 A1 * | 8/2005 | ........... C23C 28/321 |
| EP | 1 739 202 A1 | 1/2007 | |
| EP | 2 530 185 A2 | 12/2012 | |
| EP | 2 821 449 A1 | 1/2015 | |
| JP | 58-128402 | 8/1983 | |
| JP | 9-88640 A | 3/1997 | |
| JP | 2005-282429 A | 10/2005 | |
| JP | 2007-9330 A | 1/2007 | |
| JP | 2010-209913 | 9/2010 | |
| JP | 2014-185636 | 10/2014 | |
| JP | 2014-238014 A | 12/2014 | |
| JP | 2015-10229 | 1/2015 | |
| WO | WO 02/08623 A1 | 1/2002 | |
| WO | WO 2010/131587 A1 | 11/2010 | |

OTHER PUBLICATIONS

International Search Report dated Jun. 28, 2016 in PCT/JP2016/059656, filed on Mar. 25, 2016 ( with English Translation).
Written Opinion dated Jun. 28, 2016 in PCT/JP2016/059656, filed on Mar. 25, 2016.
Combined Office Action and Search Report dated Jul. 3, 2018 in Chinese Patent Application No. 201680004037.9 with English translation of categories of cited documents, 7 pages.
Office Action dated Apr. 30, 2019 in European Patent Application No. 16772646.2, 6 pages.
Extended European Search Report dated May 2, 2019 in Patent Application No. 19150766.4, 7 pages.
Office Action dated May 8, 2019 in Japanese Patent Application No. 2015-075763.

* cited by examiner

COMPRESSOR VANE OR BLADE FOR ENGINE WITH EXFOLIATING COATING

CROSS-REFERENCE TO RELATED APPLICATIONS

This application is a Continuation Application of PCT International Application No. PCT/JP2016/059656 (filed Mar. 25, 2016), which is in turn based upon and claims the benefit of priority from Japanese Patent Application No. 2015-075763 (filed Apr. 2, 2015), the entire contents of which are incorporated herein by reference.

BACKGROUND

Technical Field

The disclosure herein relates to a vane or blade of a compressor for an aircraft jet engine or a gas turbine engine, and in particular relates to a compressor vane or blade capable of keeping good aerodynamic properties as deposits on surfaces of the vane or blade naturally exfoliate.

Description of the Related Art

In an aircraft jet engine or a gas turbine engine, its combustor creates high-speed hot gas, its turbine extracts energy from the hot gas, and part of the energy is used to drive its compressor. The compressor sucks ambient air and compresses and supplies it to the combustor. The air is, in the compressor, adiabatically compressed and therefore generates high temperatures about 400-700 degrees C. for example.

While the ambient air contains various types of dust and sand as well as volcanic ash in some cases, it is unavoidable that these substances flow into the compressor.

Part of these substances may, along with the compressed air, pass through the compressor and be exhausted out but another part thereof may adhere to vanes and blades of the compressor. The ambient air further contains moisture, sulfates, sulfites, chlorides, carbonates and such in the form of gas or minute droplets, which may adhere to the vanes and the blades of the compressor as well. These foreign substances are, by being exposed to high temperatures, physically and chemically changeable into deposits that adhere to the surfaces of the vanes and the blades.

Because an excessive amount of deposits impairs the aerodynamic properties of the compressor vanes and blades, it is necessary to remove them, and, if necessary, re-finish surfaces of the vanes and the blades, in order to restore these original states. Required work includes processes of disassembling the engine, taking out each compressor vane or blade, restoring these original states individually, and re-assembling them into the engine. These laborious processes cause a marked rise in cost about overhauling the engine.

There are some proposals about some arts for coatings to address the problem raised by the deposits. The following literatures disclose related arts. Coatings disclosed therein are intended to prevent adhesion of foreign substances.

United States Patent Application Publication 2010/0247321

United States Patent Application Publication 2010/0086397

SUMMARY

Coatings according to the aforementioned related arts may work in the early stage where the foreign substances start to adhere to the surfaces of the vanes and the blades to prevent adhesion thereof. Once the adhesion starts and sticking deposits start to form, however, the coated surfaces are covered by the deposits and subsequently arriving foreign substances can become deposited on the precedent deposits. It could not be expected in this stage that the effect of the coatings amounts to much and therefore the deposits would grow as much as those in the prior arts do. More specifically, what these related arts do is nothing more than retardation of the early stage of deposition and therefore these arts cannot essentially solve the problem of the deposits. A compressor vane or blade for an engine related to the disclosure hereinafter are arts created in order to solve these problems originated from environments containing abundant foreign substances.

According to an aspect, the compressor vane or blade has a base body of the compressor vane or blade; and a coating covering the base body, the coating consisting essentially of one or more selected from the group of molybdenum disulfide and tungsten disulfide.

Preferably, the coating is limited at and fully covers an airfoil face, a platform section or an inner band section, and an outer band section. Or preferably, the compressor vane or blade further has an intermediate coating interposed between the coating and the base body. Further preferably, the coating and the intermediate coating are alternately layered to form a multi-layered coating of three sets or more layers. Still preferably, the intermediate coating consists essentially of one or more selected from the group of titanium-aluminum nitride and chromium-aluminum nitride.

BRIEF DESCRIPTION OF DRAWINGS

FIGS. 3A through 3C are schematic cross sectional views in which FIG. 3A shows a state where deposits start depositing on the coating, FIG. 3B shows a state where the coating creates interlayer slippage, and FIG. 3C shows a state where the slippage leads to exfoliation along with deposits.

DETAILED DESCRIPTION OF THE EXEMPLARY EMBODIMENTS

Exemplary embodiments will be described hereinafter with reference to the appended drawings.

As described already, the foreign substances sucked into the engine contain sulfates. Sulfates are more oxidative than oxygen and therefore gradually corrode even highly corrosion-resistant materials such as CrAlN when combined with a high temperature environment. While such corrosion results in formation of metal oxides, numerous metal oxides generated in such an environment have compact structures and are rigid, and in some cases function as anchors for holding the deposits. Therefore they do not prevent, but rather sometimes promote, adhesion of subsequent deposits thereon.

The present inventors discovered that sulfides of specific metals have layered crystal structures and layers thereof can readily slip on each other because sulfurs that connect the layers have only weak bonds therebetween, so that deposits can, along with interfaces on sulfides or interlayers just below the deposits, exfoliate. Molybdenum disulfide ($MoS_2$)

and tungsten disulfide ($WS_2$) can be served as an example for such sulfides. These sulfides are stable even in an oxidative environment and, even if these sulfides are oxidized, resultant molybdenum trioxide ($MoO_3$) or tungsten trioxide ($WO_3$) is also exfoliative. Therefore these sulfides are applicable to suppression of deposition of deposits in elevated temperature environments for a long term.

The compressor vane or blade related to the present disclosure has been created on the basis of these discoveries. It is particularly noted that, while these sulfides already known as solid lubricants are not used for the purpose of lubrication in this embodiment but are used for the purpose of prevention of deposition of deposits. Therefore a coating of a sulfide covers not sliding surfaces but exposed surfaces, and can be limited to the exposed surfaces although its details will be described later.

Figure 1:
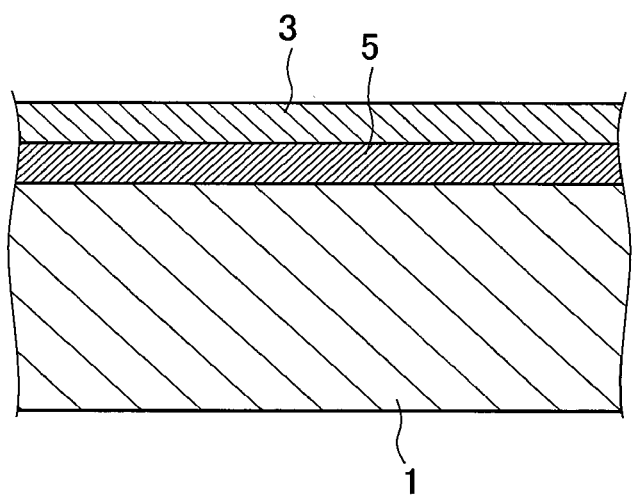
FIG. 1 is a schematic cross sectional view of a base body and a coating in accordance with an embodiment.

Referring to FIG. 1, an engine compressor vane or blade according to an embodiment is comprised of a base body 1 of the compressor vane or blade and a coating 3 covering the base body 1. The base body 1 is one of vanes and blades of a compressor for an aircraft jet engine or a gas turbine engine and is applicable to either a rotor blade or a stator vane. The coating 3 is of a sulfide such as molybdenum disulfide or tungsten disulfide for example.

The sulfide contained in the coating 3, as it has a property of promoting exfoliation of the deposits from the coating 3, suppresses deposition of the deposits for a long term. Throughout the present description and the appended claims, a coating having such a property is referred to as "exfoliative coating".

A smoother surface of the coating 3 is advantageous in light of prevention of adhesion of the deposits. Thus the surface roughness of the coating 3 is preferably 0.1 Ra or less (Ra is an arithmetic average roughness based on Japanese Industrial Standards: JIS-B-0601-2001).

Mere exposure of the aforementioned coating 3 is enough for exhibiting the inherent property and therefore, below the coating 3, any intermediate coating 5 distinguishable therefrom may be interposed. The intermediate coating 5 is formed of, or includes, any components distinct from the coating 3. The intermediate coating 5 may further include two or more layers that are distinguishable from each other.

The components for the intermediate coating 5 may be arbitrarily selected in light of various properties. A titanium-aluminum nitride ($Ti_yAl_{1-y}N$) or a chromium-aluminum nitride ($Cr_zAl_{1-z}N$) is applicable to the coating 5 in light of improvement of corrosion-resistance and erosion-resistance for example. Alternatively, any substances that are advantageous for improving adhesion between the coating 3 and the base body 1 or relaxing stress around the interface can be selected and applied to the coating 5.

Figure 2:
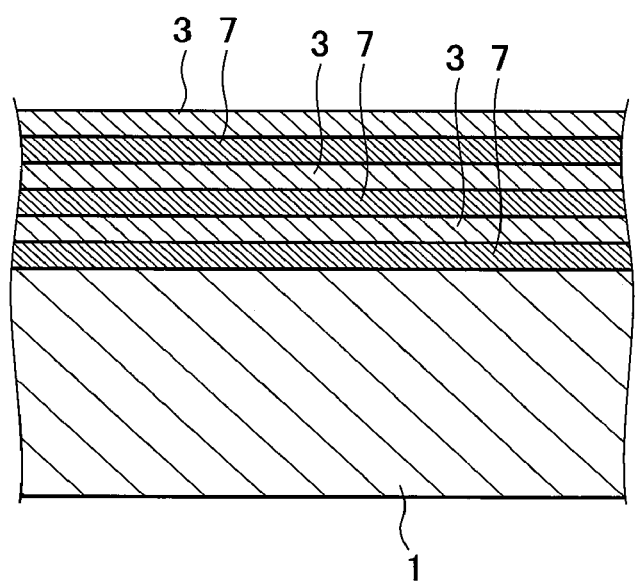
FIG. 2 is a schematic cross sectional view of a base body and a coating in accordance with another embodiment.

Still alternatively, the coating 3 and another coating 7 may be alternately layered to form a multi-layered coating of three or more sets of the alternate layers as shown in FIG. 2. To form a multi-layered structure is advantageous for relaxing residual stress or such.

In the multi-layered coating, for example, a coating of a sulfide and a coating of a titanium-aluminum nitride or a chromium-aluminum nitride may be alternately layered. Alternatively, the other coating 7 by itself may include two or more layers mutually distinguishable. Further, in the multi-layered coating, the uppermost layer is preferably the coating 3. In the multi-layered coating, each layer may be about from 10 to 20 nm in thickness.

While the coating 3 fully covers the airfoil faces of the engine compressor vane or blade at least, it may further cover its platform section (in a case of a rotor blade), or its inner band section and its outer band section (in a case of a stator vane). Further the coating 3 may be limited to these sections.

Mechanisms by which the coating 3 prevents deposition of the deposits will be described with reference to FIGS. 3A through 3C.

Figure 3A:
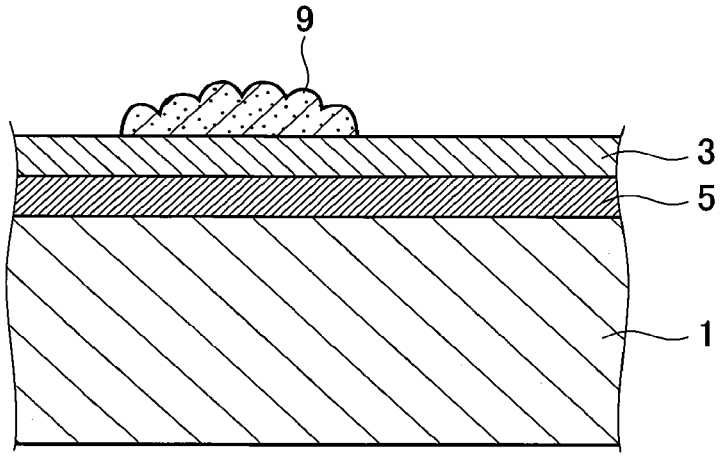
Figure 3B:
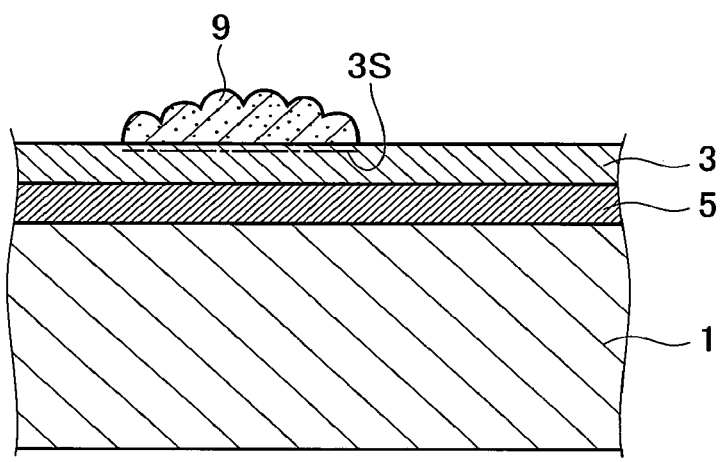

Deposits 9 contain dust, sand, volcanic ash, moisture, sulfates, sulfites, chlorides, carbonates and such, and can adhere onto the coating 3 as shown in FIG. 3A. At the interface between the coating 3 and the deposits 9, or in the coating 3 and close to the interface, as shown in FIG. 3B, a slip plane 3S comes out and the deposits exfoliate from the slip plane 3S.

Figure 3C:
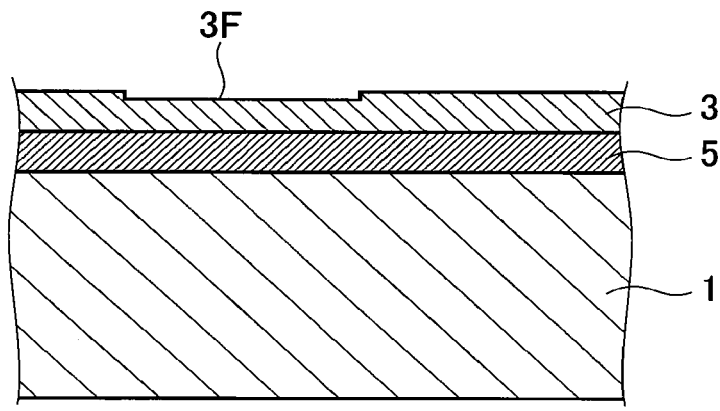

After exfoliation, as shown in FIG. 3C, a fresh surface 3F of the coating 3 is exposed and is repeatedly capable of exhibiting the properties of promoting exfoliation of deposits that are going to adhere onto the surface. The slip plane 3S is, as shearing force applied by the deposits 9 creates it, very close to the interface and therefore thickness of the coating 3 lost in each exfoliation is very small, maybe in a level of several hundred nm. The coating 3 can therefore retain its effect for a long term.

The coating 3 (or the coatings 5, 7 as well) on the base body 1 can be formed by using a known sputtering method for example. Alternatively, an arc ion plating method or any of other coating methods is also applicable. The production method by the sputtering method is carried out in a way as described below.

First the base body 1 and a target are introduced into a sputtering apparatus. The target should be of the same material as the coating 3 in principle. Described below is an example in which molybdenum disulfide is applied to the target.

In a case where the base body 1 is a rotor blade, its dovetail section is fit into the holder to combine the base body 1 with the holder. This is not only to establish electrical connection but also uses the holder to shelter the dovetail section from discharge, thereby being helpful to limit formation of the coating to a restricted portion. More specifically, this is helpful to limit formation of the coating to the airfoil faces and the platform section of the rotor blade. In a case where the base body 1 is a stator vane, structures outside the outer band section or inside the inner band section are used. This is helpful to limit formation of coating to the airfoil faces and the outer band section or the inner band section of the stator vane.

The chamber is gas-tightly closed and evacuated down to a proper vacuum by means of a vacuum pump. This is helpful to eliminate impurities. The evacuation is continued to the extent that a degree of vacuum reaches about 0.01 Pa or such.

With continued evacuation, valves of the gas supplier device are opened and thereby a working gas is introduced therein so as to regulate the pressure in the chamber. The working gas is argon for example and the pressure is 2-10 Pa for example.

By a discharge power source, a voltage is applied between the target and the chamber to generate discharge therebetween. Due to collision of ions with the target, molybdenum sulfide is knocked out of the target, partly ionized and then accelerated by a bias potential toward the base body 1, thereby forming the coating 3.

Needless to say, the same sputtering method is applicable to formation of the intermediate coating 5 or any method distinct from that for the coating 3, such as an ion plating method for example, is also applicable thereto.

As described already, sections sheltered in the holder are free from formation of the coating but gas phase particles are induced by the bias electric field to come around to all the exposed surfaces of the base body 1. Thereby the coating 3 fully covers all the surfaces other than the sheltered surfaces.

For the purpose of verifying the effects, burner rig tests are executed to compare adhesion amounts of deposits.

Figure 4:
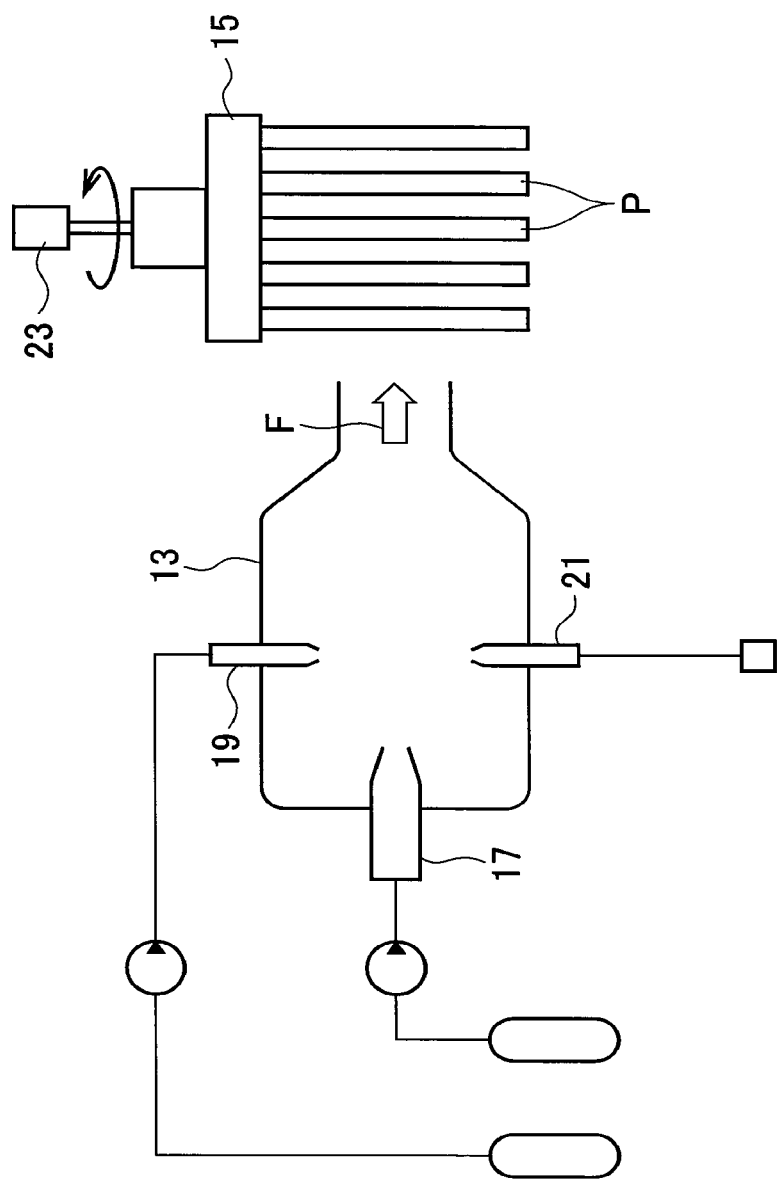
FIG. 4 is a schematic drawing of a burner rig test apparatus.

Referring to FIG. 4, a burner rig test apparatus is generally constituted of a burner 13 for generating hot gas and a holder 15 for supporting test pieces. To the burner 13, a fuel nozzle 17 comprised of a supply system for supplying kerosene for example and a salt water nozzle 19 comprised of a salt water supply system are connected. As gas flow expelled from these nozzles is ignited by a plug 21, hot gas flow F is generated. The holder 15 is so constituted as to support a plurality of test pieces P of a round bar shape. By rotating the holder 15 around an axis perpendicular to the gas flow F by means of a motor 23, the plurality of test pieces P is unitarily exposed to the hot gas flow F.

A test piece of a round bar shape formed of INCONEL718 (INCONEL is a name commonly used by persons skilled in this art field) on which a chromium-silicon nitride coating (as intermediate coatings) is formed and a molybdenum disulfide coating is formed thereon and a test piece without coatings are respectively produced.

The aforementioned test pieces are respectively served for the burner rig test. Calcium sulfate solution is supplied as salt water to the burner. Each test piece is attached to the holder and is, with rotating the holder, exposed to hot gas flow for two hours. Thereafter the test pieces are detached therefrom and subject to visual observation and weight change measurement. Table 1 summarizes the measurement result of weight changes.

TABLE 1

Weight Change after Burner Rig Test

| Coating | First Exposure (2 hours) | Second Exposure (40 hours) |
|---|---|---|
| MoS$_2$ | 0.19 | 0.17 |
| none | 0.38 | 0.31 |

The test piece without the coatings exhibits ash gray deposits adhering on whole portions exposed to the hot gas flow. While the test piece with the coatings also exhibits ash gray deposits, these deposits are partly exfoliated and portions from which the deposits come off exhibit metallic luster. The results of the weight change measurements present that the test piece without the coatings make a considerable weight gain, which is considered to be corresponding to the weight of the deposits, but the test piece with the coatings only makes a slight weight gain. As being apparent from these test results, the test piece with the coatings has a prominent effect of promoting exfoliation of the deposits as compared with that without the coatings.

Although certain embodiments have been described above, modifications and variations of the embodiments described above will occur to those skilled in the art, in light of the above teachings.

INDUSTRIAL APPLICABILITY

An engine compressor vane or blade is provided, on which deposits hardly deposit even in an environment containing abundant foreign substances.

What is claimed is:

1. A compressor vane or blade for an engine used in an environment containing abundant foreign substances, the compressor vane or blade comprising:
    a base body of the compressor vane or blade;
    a coating covering the base body, the coating consisting essentially of one or more selected from the group of molybdenum disulfide and tungsten disulfide; and
    an intermediate coating interposed between the coating and the base body,
    wherein the coating and the intermediate coating are alternately layered to form a multi-layered coating of three sets or more of alternating layers and the coating is placed as an uppermost layer in the multi-layered coating.

2. The compressor vane or blade of claim 1, wherein:
    the coating is limited at and fully covers an airfoil face, a platform section or an inner band section, and an outer band section.

3. The compressor vane or blade of claim 1, wherein:
    the intermediate coating consists essentially of one or more selected from the group of titanium-aluminum nitride and chromium-aluminum nitride.

4. The compressor vane or blade of claim 1, wherein:
    the coating and the intermediate coating are formed on the base body by sputtering.

* * * * *